B. R. SEABROOK.
DIFFERENTIAL RAILWAY AXLE.
APPLICATION FILED JULY 6, 1909.
956,195.
Patented Apr. 26, 1910.
2 SHEETS—SHEET 1.
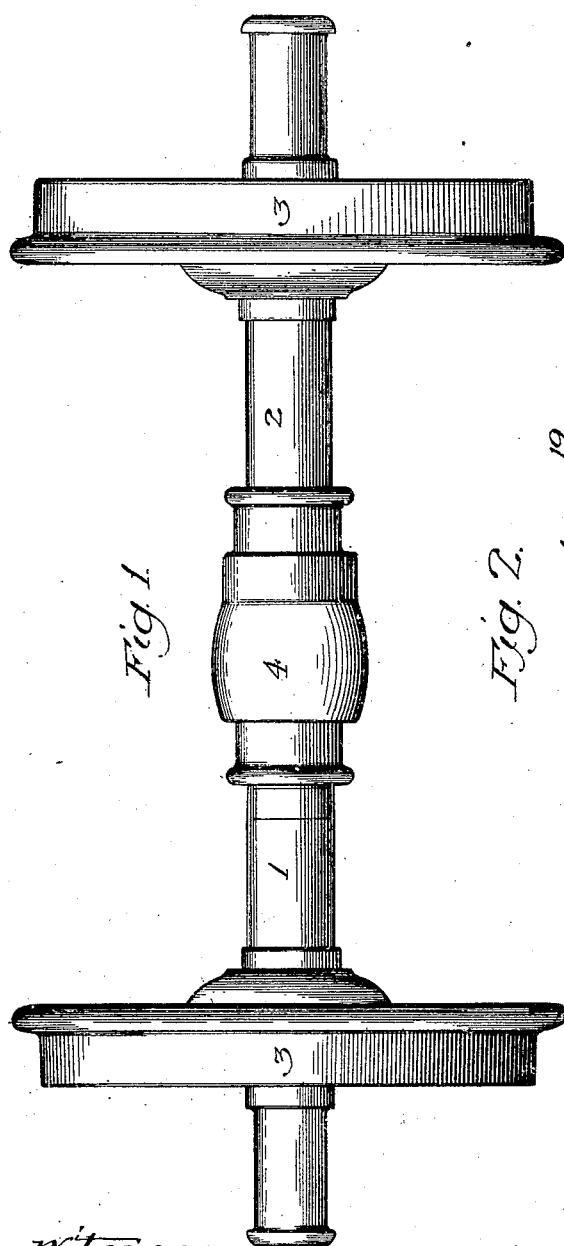
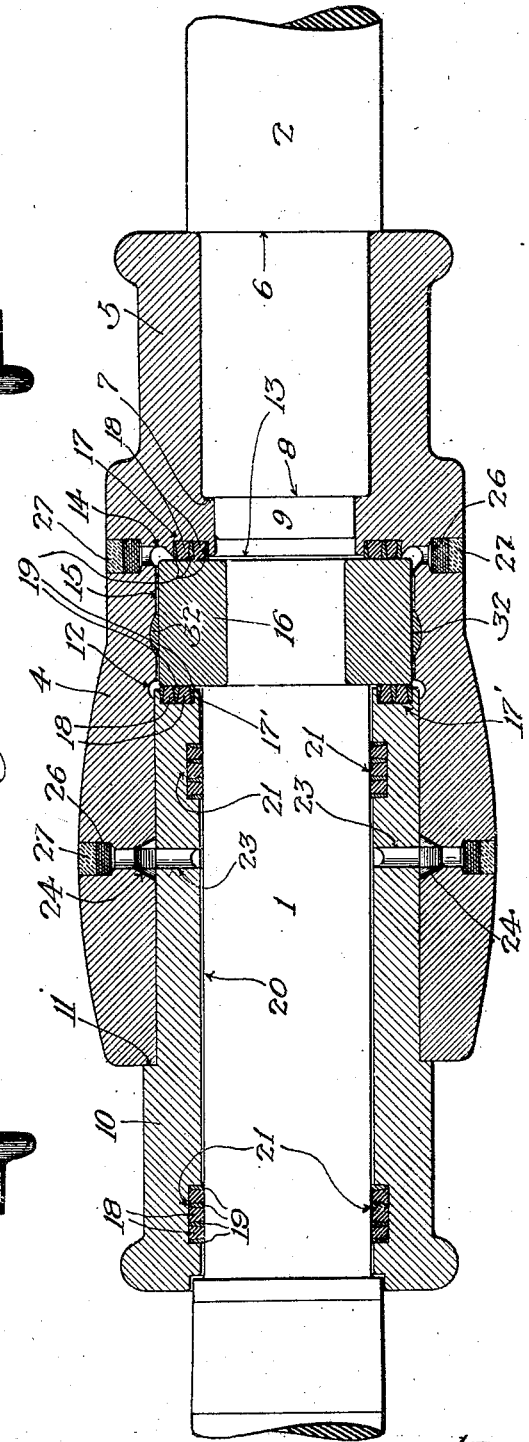
Witnesses:
Inventor:
Bagster Roads Seabrook

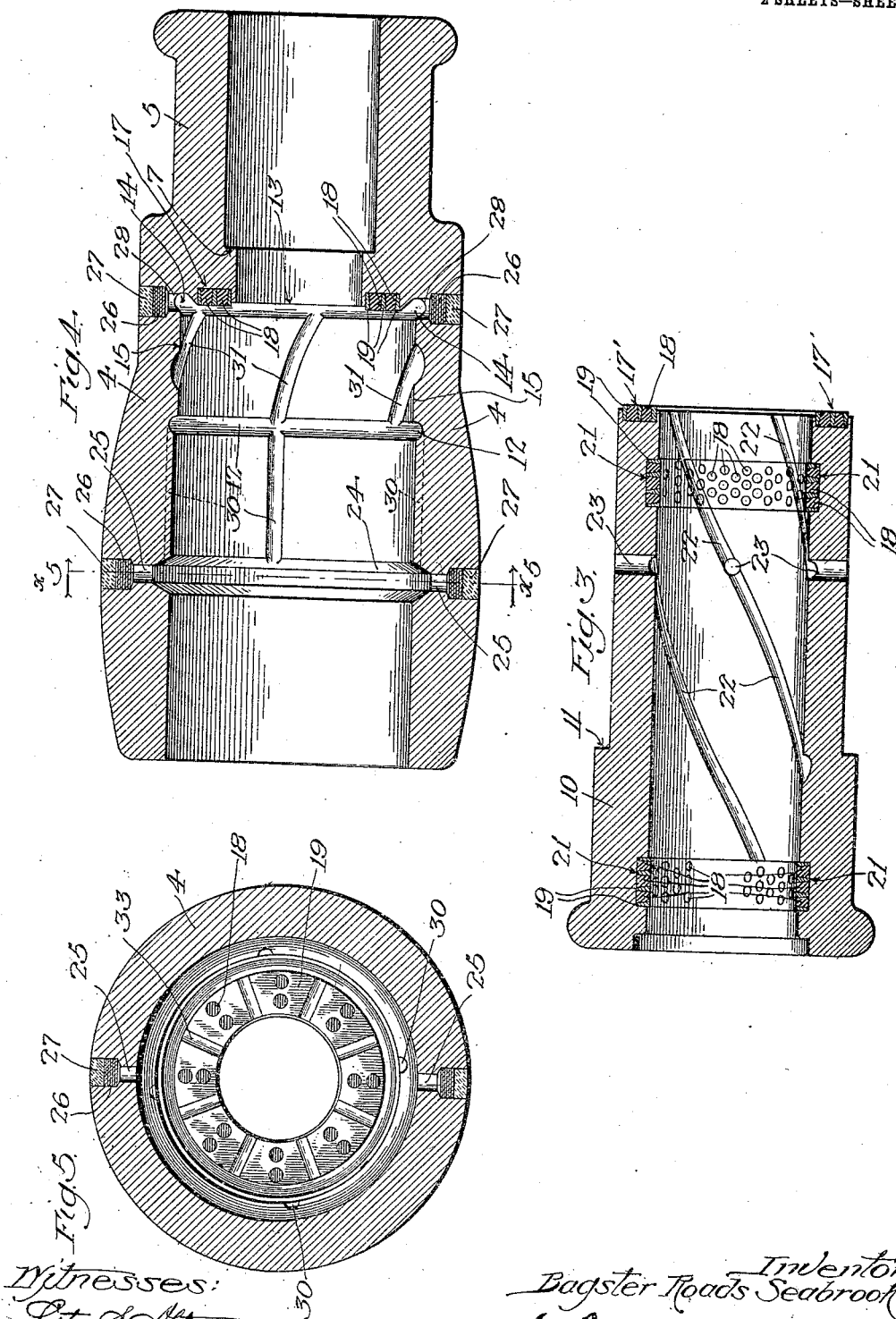

UNITED STATES PATENT OFFICE.

BAGSTER ROADS SEABROOK, OF LOS ANGELES, CALIFORNIA.

DIFFERENTIAL RAILWAY-AXLE.

956,195.　　　　　　　　Specification of Letters Patent.　　Patented Apr. 26, 1910.

Application filed July 6, 1909.　Serial No. 506,231.

*To all whom it may concern:*

Be it known that I, BAGSTER ROADS SEABROOK, a subject of the King of England, residing at Los Angeles, in the county of Los Angeles and State of California, have invented new and useful Improvements in Differential Railway-Axles, of which the following is a specification.

This invention relates to differential railway axles, and the object of the invention is to provide improvements thereof as will be hereinafter described.

Referring to the drawings: Figure 1 is a front elevation. Fig. 2 is a longitudinal section through the coupling. Fig. 3 is a longitudinal section in detail of the inner sleeve. Fig. 4 is a longitudinal section in detail through the outer sleeve. Fig. 5 is a section on line $x^5$—$x^5$ Fig. 4.

1 and 2 designate the respective axle sections, each of which is provided with a wheel 3.

4 is an outer sleeve having a reduced end 5 which is internally machined for a press fit and is forced onto axle member 2, the outer end of the reduced portion 5 abutting against a shoulder 6 and having an internal shoulder 7 which abuts against a shoulder 8 on the axle member 2. The axle member 2 has a reduced end portion 9 which has a press fit within the outer sleeve 4.

The outer sleeve 4 has a large internal diameter which receives with a press fit the inner sleeve 10, the latter having a shoulder 11 which abuts against the end of the outer sleeve 4, and the inner end of the inner sleeve 10 terminating at an annular groove 12 formed in the outer sleeve which while providing a tool clearance in machining the part serves primarily as a duct for the distribution of lubricant. The outer sleeve 4 also has a shoulder 13 in the corner of which is an annular groove 14, which acts as a tool clearance and also as a distributing channel for a lubricant. The internal bore at 15 of the outer sleeve 4 is a trifle smaller in diameter than the larger bore thereof, and mounted therein with a loose fit is a retaining collar 16 which is riveted on the end of the axle section 1.

Embedded in the shoulder 13 is a lubricating ring 17 comprising a series of graphite pedestals 18 with babbitt 19 in the intervening spaces and the lubricating ring thus formed receives the end thrusts of the retaining collar 16, the thickness of the lubricating ring being such that part of the ring protrudes from the shoulder 13, as clearly shown in Fig. 4, so that the collar 16 does not come in contact with the shoulder 13. The inner end of the inner sleeve 10 is also provided with a similar lubricating ring 17' which also protrudes slightly from the end of the inner sleeve 10 and takes the thrust of the collar 16 preventing the latter from coming in contact with the end of the sleeve 10.

The inner sleeve 10 is bored slightly larger than the axle member 1, as clearly shown in Fig. 2, leaving an annular space 20 which serves as a lubricant chamber. The inner sleeve 10 is provided with two lubricating rings 21 which are arranged in annular grooves formed in the sleeve 10 and the smaller diameters of the rings 21 are less than the internal diameter of the sleeve 10, the rings 21 closely fitting the axle member 1 with a running fit. The outer-most ring 21 serves to seal the outer end of the lubricant chamber 20 and prevents the escape of lubricant.

The inner sleeve 10 has a series of rifled grooves 22, as clearly shown in Fig. 3, and is also provided with a series of radial lubricant passages 23 which communicate with the respective rifle grooves 22. The outer sleeve 4, as clearly shown in Figs. 2 and 4, is formed with an internal annular lubricant distributing groove 24 with which the radial lubricant passages 23 communicate and the outer sleeve 4 has two diametrically opposite passages 25 which extend through the walls of the outer sleeve and serve for the introduction of lubricant. The outer portion of each passage 25 is enlarged and a series of thin plugs 26 formed of brass or iron fit loosely therein and are retained by steel cement 27. A series of passages 28 also communicate with the groove 12 and are closed by similar plugs 26 and steel cement 27. Extending from the annular groove 12 to the annular groove 14 are rifle grooves 31 which are filled with babbitt 32 forming a bearing in which the collar 16 revolves.

The axle is lubricated by lubricant contained within the various lubricant passages and chambers, the lubricant being introduced through one of the passages 23, and then the thin plugs 26 are inserted, after which steel cement 27 plugs the cavity. Lubricant is also introduced through the passages 28, the passages being sealed in a similar manner after the introduction of the lubricant. In order to permit the lubricant to pass inward from the groove 14, the lubricating ring 19 is provided with cross cuts 33, as shown in Fig. 5.

What I claim is:—

1. A differential axle comprising two axle sections, collars on the respective sections, one axle section being rigid in its collar, the other axle section being loose in its collar, a retaining ring on the latter axle section, there being an annular space between the latter axle section and its collar forming a lubricant chamber, a lubricating ring near the inner end of the inner collar and closely encircling the axle section, and a lubricating ring near the outer end of the inner collar sealing said lubricant chamber.

2. A differential axle comprising two axle sections, collars on the respective sections, one axle section being rigid in its collar, the other axle section being loose in its collar, a retaining ring on the latter axle section, there being an annular space between the latter axle section and its collar forming a lubricant chamber, a lubricating ring near the inner end of the inner collar and closely encircling the axle section, and a lubricating ring near the outer end of the inner collar sealing said lubricant chamber, the inner collar having rifle grooves which terminate at one end inside of the last named lubricating ring and which extend through the first lubricating ring to the retaining ring.

3. A differential axle comprising two axle sections, collars on the respective sections, one axle section being rigid in its collar, the other axle section being loose in its collar, there being a lubricating chamber formed between the latter collar and axle section, a retaining ring on the latter axle section, there being a lubricant space between each end of the retaining ring and outer and inner collars, the outer and inner collars each having a passage for the introduction of lubricant, disks loosely fitting in the outer part of the passages, and steel cement plugging the cavities outside the disks.

In testimony whereof, I have hereunto set my hand at Los Angeles, California, this 19th day of June 1909.

BAGSTER ROADS SEABROOK.

In presence of—
G. T. HACKLEY,
FRANK L. A. GRAHAM.